United States Patent [19]

Just et al.

[11] Patent Number: 4,841,040

[45] Date of Patent: Jun. 20, 1989

[54] PHOSPHATED, OXIDIZED STARCH AND USE OF SAME AS DISPERSANT IN AQUEOUS SOLUTIONS AND COATING FOR LITHOGRAPHY

[75] Inventors: Ernst K. Just; Robert G. Nickol, both of Wilmington, Del.

[73] Assignee: Aqualon Company, Wilmington, Del.

[21] Appl. No.: 131,053

[22] Filed: Dec. 9, 1987

[51] Int. Cl.$^4$ .............................................. C08B 31/06
[52] U.S. Cl. ...................................... 536/105; 106/92; 106/114; 106/213; 106/214; 524/49; 524/51; 524/52
[58] Field of Search ........................................ 536/105

[56] References Cited

U.S. PATENT DOCUMENTS

| | | | |
|---|---|---|---|
| 3,547,907 | 12/1970 | Shepherd et al. | 536/105 |
| 3,629,121 | 12/1971 | Eldib | 252/89 |
| 3,654,263 | 4/1972 | Cescato | 536/105 |

FOREIGN PATENT DOCUMENTS

| | | |
|---|---|---|
| 3203067 | 1/1982 | Fed. Rep. of Germany . |
| 1330122 | 8/1970 | United Kingdom . |
| 1330123 | 8/1970 | United Kingdom . |

OTHER PUBLICATIONS

47 J. Amer. Oil Chem. Soc., pp. 522–524 (1970).
79 J. Am. Chem. Soc., 6460–6464 (1957).

Primary Examiner—John Kight
Assistant Examiner—Frederick Krass
Attorney, Agent, or Firm—Mark D. Kuller

[57] ABSTRACT

A novel phosphated, oxidized starch having a molecular weight of about 1,500 to about 40,000 Daltons, a carboxyl degree of substitution of 0.30 to 0.96, and a phosphate degree of substitution of from about 0.002 to about 0.005, which is useful as a dispersant for aqueous, high-solid slurries of minerals and inorganic pigments, as a replacement for gum arabic in gumming and fountain solutions for lithography, and as a drilling fluid additive.

10 Claims, No Drawings

PHOSPHATED, OXIDIZED STARCH AND USE OF SAME AS DISPERSANT IN AQUEOUS SOLUTIONS AND COATING FOR LITHOGRAPHY

This invention relates to a novel phosphated, oxidized starch which is useful as a dispersant in aqueous, high-solid slurries of minerals and inorganic pigments, as a substitute for gum arabic in gumming and fountain solutions for lithography, and as an additive to drilling fluids.

The term "dispersion" is used herein to refer to all aqueous dispersions or aqueous slurries comprising one or more solids dispersed in an aqueous medium such as high-solids aqueous systems containing pigments used in paper manufacture. A dispersion may thus be a thick, spreadable paste, a latex paint or a highly fluid aqueous dispersion used for paper sizing or coating.

Dispersions are used to control the rheology of high-solid systems containing pigments and filler such as latex paints, joint cements, drilling muds, paper coating colors and paper coatings. The dispersants most widely used for this purpose are low molecular weight anionic polymers bearing a multiplicity of carboxylate, sulfonate, phosphonate or phosphate groups. Accordingly, high-solid cakes or pastes of fillers and pigments are commonly dispersed or thinned with various polyphosphates, lignosulfonates or carboxylated polymers. The latter are often polymers of salts of acrylic or maleic acids or their various copolymers or carboxylated polysaccharides such as low molecular weight sodium carboxymethyl cellulose (CMC).

Anionic dispersants are believed to adsorb on the surface of fillers such as clays and pigments to enhance the negative charge of or provide a negative charge to the filler surface. Mutual repulsion between like charged particles then serves to separate filler particles and keep them from reagglomerating into intractable, non-flowing pastes.

In paper manufacture, clays and pigments are supplied to paper mills predispersed using anionic dispersants in high-solid slurries. The repulsive forces which separate the particles are then counteracted using cationic retention aids whereby the clays and pigments are precipitated out of the aqueous phase and onto the paper stock during paper manufacture.

Polymeric orthophosphates are effective dispersants for many particulates. Their hydrolytic instability and their tendency to bloom to the surfaces of coatings is a disadvantage, however. Compared to polyphosphates, monomeric orthophosphates, the end hydrolysis product of polyphosphates, are not very efficient dispersants. Synthetic polyanionics, such as the polyacrylates, are not as susceptible to hydrolysis and loss in dispersancy, but their high charge density and persistence can be a disadvantage in applications where dispersed particulates need to be reflocculated or reagglomerated, as is necessary in paper manufacture.

Lignosulfonates are used principally as thinners, i.e., dispersants, in clay-based drilling muds, but their very dark color precludes any significant use in applications where color and brightness are important, such as in paper manufacture.

Applicants have discovered a novel phosphated, oxidized starch which is useful as a dispersant for e.g., clay, titanium dioxide, calcium carbonate and inorganic pigments in high-solids aqueous systems. These phosphated, oxidized starch compositions, when used to prepare high-solid dispersions are found to require use of lower amounts of cationic retention aids during paper manufacture than conventionally used polyacrylate dispersants.

While oxidized starch compositions are known, their use as primary clay and pigment dispersants for a high-solid dispersion has not previously been appreciated. Thus, detergent builder compositions resulting from extensive oxidation of starch with sodium hypochlorite are disclosed in a number of patents, i.e., U.S. Pat. No. 3,629,121 Eldib, British No. 1,330,122 Bright et al and British No. 1,330,123 Bright et al. These builder molecules are recognized in Wilham et al, 47 *J. Amer. Oil Chem. Soc.* page 522 (1970) for their ability to sequester alkaline earth cations, but no mention is made of any awareness that they are also capable of dispersing pigments at high-solid levels.

German Patent Application No. 32030-67 discloses the use of oxidized starch and starch phosphate in combination with low molecular weight CMC in dispersing gypsum or phosphogypsum suspensions. However, when used alone, the uncharacterized starch phosphate tends to flocculate the suspension. Molecular weights of the two oxidized starches described in the German application are given as 200,000 and about 100,000. The latter, lower molecular weight composition, additionally described as being hot water soluble, is disclosed to be the more effective gypsum dispersant.

The novel phosphated, oxidized starch of this invention has about 15% to about 48% of its repeating anhydroglucose ring units cleaved between carbon atoms 2 and 3 and oxidized to carboxyl groups, a molecular weight of about 1,500 to about 40,000, preferably about 5,000 to about 30,000, most preferably 15,000 to 20,000 Daltons, and a phosphate degree of substitution from about 0.002 to about 0.005. In addition, this invention is directed to an aqueous solution and an aqueous, high-solid dispersion of minerals, inorganic pigments or mixtures thereof dispersed with the phosphated, oxidized starch.

The phosphated, oxidized starch of this invention is freely cold water soluble. It can be produced by the oxidation and depolymerization of starch by reaction with sodium hypochlorite in an alkaline medium whereby the bond between carbon atoms 2 and 3 of the repeating anhydroglucose residue is cleaved and the carbon atoms are oxidized to carboxylate groups as taught by Whistler and Schweiger, 79 *J. Am. Chem. Soc.* 6460 (1957).

The pH of the reaction medium is maintained between 7.5 and 10.0 and preferably between 8.5 and 9.0. At high pH the reaction rate becomes sluggish, while inefficient oxidation occurs below pH 7.0. Temperatures are maintained between about 25° and 65° C. and preferably between 45° and 50° C. Reaction rates below 35° C. are slow. Higher temperatures occasion increasing conversion of hypochlorite into chlorate which is not an oxidant for starch.

All starches, such as corn, tapioca, sago, wheat, rice and potato starch, are suitable substrates for reaction and, depending on the extent of oxidation, gradually dissolve as oxidation proceeds in the alkaline reaction medium. In this respect, waxy maize and potato starch are especially preferred because complete granule dissolution is achieved at low conversion earlier in the reaction. High amylose containing starches, e.g., those containing 50 wt. % or more amylose, are difficult to use as they are not readily oxidized due to their inability to readily go into solution when treated with sodium hypochlorite and sodium hydroxide. Higher levels of sodium hypochlorite will eventually bring high amylose containing starches into solution.

The starch can be slurried directly in sodium hypochlorite solutions (ca. 5% as chlorine). The rate of oxidation can be controlled by temperature and correct pH can be maintained through addition of sodium hydroxide or other alkali as sodium hypochlorite is consumed in the oxidation reaction. Alternatively, sodium hypochlorite and sodium hydroxide solution can be added to concentrated (40%) slurries of starch in water. This latter method is especially preferred because the rate of this highly exothermic reaction (ca. 665 calories per gram of starch) can thus be controlled by the rate of sodium hypochlorite addition. The added degree of control attained by this technique permits the safe use of more concentrated starch slurries and stronger sodium hypochlorite solutions (approximately 12% as chlorine), both of which result in higher product concentrations in final reaction solutions.

The phosphated or unphosphated oxidized starch is recovered in the form of the alkali metal salt of the carboxylic acids formed during the oxidation procedure. The sodium or other alkali metal salts are insoluble in aqueous organic solvents such as acetone, and the corresponding free acid is soluble in water, but is also insoluble in organic solvents such as acetone. The free acid is formed from the alkali metal salts of the carboxylic acids by reaction with any strong acid such as a mineral acid, for example, hydrochloric acid.

To measure the degree to which oxidation has occurred, the amount of carboxylic acid groups on the starch molecule are measured by conventional titration techniques. In this procedure, a measured amount of phosphated or unphosphated starch which has been oxidized and exists as the sodium salt is slurried in acetone and is neutralized with an excess of a strong acid such as hydrochloric acid. This converts the sodium salt of the acid groups on the oxidized starch to the free acid form. This form of the starch is insoluble in the acetone and remains dispersed and settles to the bottom of the vessel containing the dispersion. An aliquot of the supernatant solution is then titrated with a strong base, such as sodium hydroxide (0.1N solution) to the phenolphthalein end point. This back titration gives the amount of unneutralized hydrochloric acid and thus by subtraction from the amount of acid added, the amount of acid groups formed during oxidation. The amount of hydrochloric acid which did not react with the alkali metal salt of the initially formed oxidized starch can then be related to the extent of oxidation in terms of sodium hydroxide milliequivalents per gram of oxidized starch (ME), a value that, in turn, is related to the average gram equivalent weight of repeating polymer unit (EW) by $$ME = 1000/EW$$

The degree of substitution (D.S.), or average number of carboxyl groups per anhydroglucose residue, can be calculated by using the following relationships:

$$\frac{1000}{ME} = \frac{162 + 45\ D.S.}{D.S.}$$

The extent of oxidation in phosphated, oxidized starch generally ranges from about 1.7 to about 4.7 milliequivalents of caustic (sodium hydroxide) which corresponds to degrees of carboxyl substitution of about 0.30 to about 0.96, respectively (i.e., about 15% to about 48% of the anhydroglucose unit rings are cleaved and oxidized to carboxyl-containing units). Preferably, the extent of oxidation ranges from 2.4 to 2.7 milliequivalents which corresponds to a carboxyl D.S. range of 0.44 to 0.50, (i.e., about 22% to about 25% of the anhydroglucose units are cleaved and oxidized to carboxyl-containing units).

Other methods may be used to prepare the oxidized starch intermediate. For instance, an oxidized starch may be produced by a two-step procedure involving the treatment of starch (1) with sodium periodate to obtain dialdehyde starch (2), followed by oxidation with sodium chlorite under acidic conditions as depicted below:

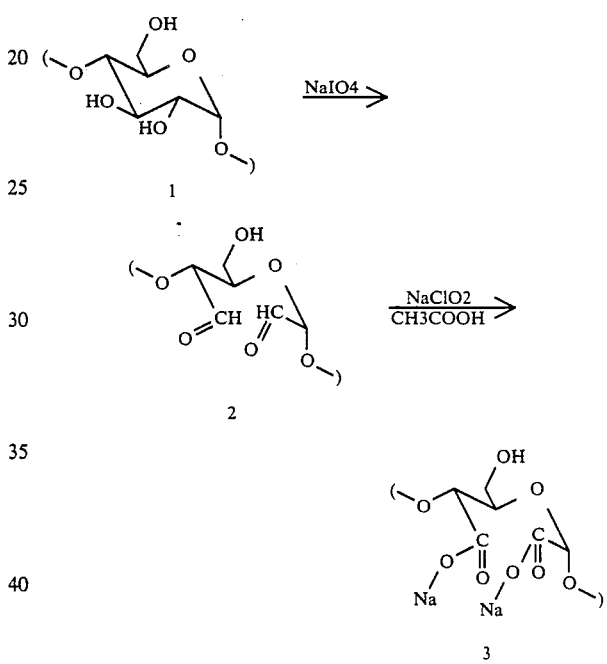

After neutralization, dicarboxy starch (3) can be isolated in good yield. This procedure is shown in Wilham et al, cited above.

The hypochlorite method is faster and less expensive than the two-step process and produces a product having a lower molecular weight which is generally more desirable.

The phosphate ester group can be introduced either before the bleach oxidation of starch or afterwards. Phosphating agents for starch are well known. Phosphoric acid, phosphorous pentachloride, phosphoryl chloride as well as a number of polymeric sodium orthophosphates are among the more useful ones. An especially convenient phosphating agent for purposes of this invention is sodium trimetaphosphate which reacts either homogeneously with concentrated solutions (15-25%) of oxidized starch or heterogeneously with unmodified starch granules in aqueous 40% slurry.

Phosphate is naturally present in all biological systems (as an energy exchange medium). For instance, corn starch can contain up to 0.015%, by weight, of phosphorous (bound and unbound). This invention is directed to use of phosphate in an amount greater than naturally present in such biological systems. Generally, the phosphate degree of substitution is about 0.002 to about 0.005, preferably about 0.003 to about 0.005 and most preferably 0.004 to 0.005. The phosphate degree of substitution is calculated as if only monomeric phosphate moieties are present, but there may be minor amounts of polymeric species (comprising, for instance, 2 or 3 phosphate moieties).

Generally, aqueous solutions prepared by bleach addition contain the phosphated, oxidized starch in an amount of about 0.01 to about 16 wt. % by weight of the total aqueous solution. The phosphated, oxidized starch can be precipitated from such aqueous solutions using methanol or acetone. The isolated product is a white granular composition (greater than 90% pruity; impurities include NaCl). By precipitating and redissolving the phosphated, oxidized starch, aqueous solution containing up to about 50 wt. %, by weight of the total aqueous solution, can be prepared.

As stated, the phosphated, oxidized starch of this invention is useful as a dispersant. It can be used to control the rheology of high-solid systems such as latex paints, joint cements, drilling muds, paper coatings and filler slurries. The phosphated, oxidized starch of this invention is also useful as detergent builder and as a replacement for gum arabic in lithography.

The phosphated, oxidized starch of this invention can be used as a dispersant alone or in combination with other dispersants. An examplary amount, which is not intended to be limiting, is about 0.2 to about 0.6%, by weight of the dispersed solids. It can be used as a partial replacement for polyacrylates in paper furnishes, providing improved stability and control over viscosity of the pigment dispersion, as well as improved retention of the pigment.

Phosphated, oxidized starch can be used with cationic and amphoteric retention aids commonly used in the paper trade, such as guar, polyacrylamides and cationic starch. When the phosphated, oxidized starch is used as a dispersant in paper coatings, lower amounts of cationic polymers, used as retention aids, are required to neutralize particulate surface charge, than with conventionally used materials such as polyacrylates. The benefits in retention offered by the composition of this invention are best realized in neutral or alkaline paper furnishes. Filler retention in furnishes made acidic (pH approximately 4 to 5) with alum is largely independent of dispersant type. The level of alum in these acid furnishes is sufficiently high to overwhelm completely and mask any differences in charge densities between sodium polyacrylate and oxidized starch compositions.

Unbound salt by-products (e.g., NaCl, sodium orthophosphate, sodium pyrophosphate, sodium tripolyphosphate) that are associated with phosphated, oxidized starch and arise from esterifications with polyphosphates are innocuous to the thinning efficiencies of phosphates, oxidized starches in kaolin clay dispersions. However, phosphate is a flocculant for calcium carbonate. Thus, calcium carbonate pastes titrated with phosphated, oxidized starch mixed with up to about 10% phosphate salt thin slightly, but then rigidly increase in viscosity, eventually forming a paste, as more phosphate and dispersant are added. In contrast, a 75% paste of calcium carbonate dispersed with a phosphate esterified, oxidized waxy maize starch that is largely purified of unbound salt phosphates thins to a low viscosity that remains unchanged with continued addition of the dispersant.

The phosphated, oxidized starch of this invention is also useful in lithography as replacement for gum arabic in gumming solutions and fountain solutions. Gumming solutions containing the phosphated, oxidized starch of this invention are useful for coating non-image areas of developed lithographic plates that are to be printed with oily inks. Generally, such gumming solutions are comprised of the phosphated, oxidized starch and small amount of preservative, e.g., 0.1%, based on the total weight of the solution, of methyl parasept (methylparahydroxybenzoate). In addition, acids may be used to lower their pH to that of conventional gum arabic solutions, i.e., 4.5 to 5.5 (commercial products may have a pH as low as 3.8). Phosphoric acid is a preferred acid since it aids in desensitizing the printing plate.

The phosphated, oxidized starch may be used in essentially the same manner that gum arabic is used for such coating. That is, non-image areas of a lithographic printing plate are coated with a hydrophilic composition containing phosphated, oxidized starch, oleophilic image areas are coated with a hydrophobic ink, and all or a portion of the ink is imagewise transferred to a recording medium. Gummed plates are often stored prior to printing, awaiting availability of a press. Thus, the function of the gumming solution is to protect the plate from scratches, oxidation dirt and fingerprints, and to desensitize the non-image area so it does not pick up ink during the printing process.

Fountain solutions are applied during printing to the non-image areas of printing plates to keep them desensitized. Such gum solutions are constantly applied to provide a thin coating of water soluble polymer to replace the gum coating (applied during the gumming process) which wears out during printing. Typically, fountain solutions per this invention comprise phosphated, oxidized starch, acid, e.g., phosphoric acid, pH buffer and a preservative. Generally, one to two ounces of the concentrated fountain solution is diluted with one gallon of water (80/20 water/isopropanol may be used to lower surface tension and reduce the amount of fountain solution needed) in use on a press.

The phosphated, oxidized starch of this invention may be used as an additive to drilling fluids, also known as "drilling muds", used to remove cuttings from boreholes. It is especially useful as a drilling mud thinner. It works well as a thinner for muds containing bentonite clay at room temperature, but in this application it does not work as well at higher temperatures such as 150° F. and 200° F. The phosphated, oxidized starch are particularly useful with muds contaminated with lime and cement. Therein, the phosphated, oxidized starch is added to deflocculate the clay thickeners, e.g., bentonite, and maintain proper fluidity and viscosity. In such contaminated muds, the phosphated, oxidized starch works well at temperatures of 250° F. or higher. The phosphated, oxidized starch may be added to drilling muds in its dried, purified form or as a non-purified liquid.

The following examples, which are exemplary and not intended to be limiting, illustrate the preparation and use of the phosphated, oxidized starch of this invention. Therein, all parts, percentages, etc., are by weight, unless otherwise indicated.

The first example demonstrate preparation of oxidized starch intermediates. Subsequent examples show preparation and use of phosphated, oxidized starch per this invention.

PREPARATION EXAMPLE 1

This example demonstrates preparation of an oxidized starch, which can be phosphated to produce a phosphated, oxidized starch per this invention.

To a 2 liter resin kettle, equipped with an internal coil or stainless tubing for hot water heating and cold water cooling, air-driven Teflon paddle stirrer, thermometer, two dropping funnels and pH electrode was added a 40% aqueous corn starch slurry (180 g starch, dry basis; 1.11 anhydroglucose equivalents). The slurry was heated to 50° C. and, then, a 20 g increment of concentrated alkaline sodium hypochlorite solution (12.5 w/w % as $Cl_2$) was added with agitation to initiate the reaction, resulting in a momentary pH rise from about 6.5 to 11.0. Thereafter, the remaining sodium hypochlorite (620 g, 1.13 mole total as $Cl_2$) was added from a dropping funnel at a continuous rate of 6.9 g (or 0.86 g $Cl_2$) per minute. A sodium hydroxide solution (13 g/100 ml water) was added from a dropping funnel at a rate sufficient to maintain the medium pH of the medium between 8.5 and 9.0 (sodium hydroxide was consumed throughout the reaction). The reaction temperature was maintained at 50° C. by intermittent passage of cooling water through the heating/cooling coils. As the reaction proceeded, the oxidized starch solids dissolve in the reaction medium and formed a clear to hazy, water-thin solution. After the sodium hypochlorite addition was completed, the pH was maintained at about 8.5 to 9.0 by incremental sodium hydroxide (above solution) addition and agitation was continued at 50° C. until all the bleach was consumed.

The latter condition was indicated by constant pH over a 15 minute interval after a caustic adjustment, and by the absence of oxidizing in a negative starch-iodide test for residual bleach.

The resulting solution was an intermediate composition that could have been used to prepare a phosphated, oxidized starch per this invention. The solution was neutralized and worked-up as described below, then used as a control dispersant in example 5 below.

The resulting solution was neutralized with concentrated hydrochloric acid to pH 7.0 as solutions left alkaline gradually darken on standing.

Work up consisted of precipitating the cooled (25° C.) solution into 8 liters of methanol filtering out the oxidized starch, washing the filter cake solids twice with 500 ml of methanol, and then and drying them at 50° C. The product had a carboxyl D.S. of 0.43.

PREPARATION EXAMPLE 2

This example demonstrates preparation of an oxidized starch, which can be phosphated to produce a phosphated, oxidized starch per this invention.

In a five gallon plastic bucket, equipped with air-driven Teflon paddle stirrer, a thermometer and combination pH electrode, corn starch (96 g, 0.59 anhydroglucose equivalents) was slurried in pre-chilled (20° C.) sodium hypochlorite (2400 ml, 130 g $Cl_2$ by iodometric titration, 1.83 mole) stabilized with sodium bicarbonate (2.52 g, 0.03 mole). The reaction was initiated by adjusting the pH to 8.5 with concentrated HCl (12N solution). As the reaction proceeded, sodium hydroxide solution (13 g Na/100 ml water) was added via a dropping funnel to maintain the pH at 8.0–8.5. The extent of reaction was monitored by measuring the temperature and quantities of base and oxidant consumed. The maximum temperature (approximately 35° C.) was reached after 15 minutes. After one hour, about 90% of the base and oxidant were consumed. The reaction was allowed to proceed until starch-iodide testing of solution aliquots indicated the absence of bleach oxidant (Alternatively, the reaction could have been terminated by addition of sodium metabisulfate). The product could have been used as a dispersant or as an intermediate to prepare a phosphated, oxidized starch per this invention. However, it was neutralized and worked-up as in the same manner as in Example 1. A white product (108 g, 12% moisture, 33.3% ash as $Na_2SO_4$ and carboxyl D.S. of 0.72) resulted.

PREPARATION EXAMPLE 3

This example demonstrates preparation of a phosphated, oxidized starch per this invention.

The 2 liter kettle of Example 1 was charged with a slurry of 180 parts by weight corn starch (dry basis, 1.11 anhydroglucose equivalents) containing 36 parts by weight sodium trimetaphosphate (STMP), and 450 parts by weight water. The mixture was heated to 50° C. after which sodium hydroxide (13% solution) was added to adjust the pH to 11.0. Temperature and pH were maintained for one hour after which sodium hypochlorite (652 g at 12.1% $Cl_2$, 1.11 mole $Cl_2$) and sodium hydroxide addition was carried out as described in Example 1. Neutralization and work-up by precipitating the cooled reaction solution into methanol (8 liters plus two 500 ml washes) yielded a white solid having a carboxyl D.S. of 0.42 and containing 3.6% phosphorous of which 0.06% was bound to the product in ester linkage.

PREPARATION EXAMPLE 4

This example demonstrates preparation of a phosphated, oxidized starch per this invention.

Corn starch was oxidized as described in preparation Example 1. After the bleach was consumed, an 18% solution of STMP was added at a ratio of 0.2:1 (STMP:dry starch), as shown in Table I, by weight of dry starch originally oxidized. The reaction solution was adjusted to pH 10.5 with sodium hydroxide (13% solution), heated to 70° C. and maintained at temperature for 45 minutes. Subsequent neutralization with hydrochloric acid followed by precipitation into methanol yielded a product having a carboxyl D.S. of 0.41 containing 4.3% phosphorous of which 0.1% is bound in ester linkages.

The following examples demonstrate the use of oxidized starches and phosphated, oxidized starches.

EXAMPLE 5

The addition of effective concentrations of dispersant to high-solid pastes results in drastic viscosity decreases and transforms them into free-flowing dispersions. This response to dispersant addition was used to evaluate the efficiencies of oxidized starches and phosphated, oxidized starches.

Oxidized and phosphated, oxidized starch compositions were added to high-solid pastes of kaolin clay (70%) or calcium carbonate (75%) either directly in solid form or in aqueous 25% solutions. Addition was accompanied by good mechanical agitation using a high speed stirrer or Gifford-Wood Homogenizer Mixer. The pH of dispersed clay slurries was adjusted to 7.0 to 7.5 by addition of solid sodium carbonate. The slurries were cooled to room temperature before measuring Brookfield viscosities.

Table I shows results obtained with Kaolin clay. Table II shows the results obtained for calcium carbonate.

TABLE I

Kaolin Clay

| Sample | Starch Type | Oxidation Method as By Example | STMP Ratio[1] | % P, as Ester[2] | Product % P, as Salt[3] | Carboxyl D.S. | 70% Clay Viscosities[4] (cps × 10$^{-3}$ Dispersant) | | | | |
|---|---|---|---|---|---|---|---|---|---|---|---|
| | | | | | | | 0.2 | 0.3 | 0.4 | 0.5 | 0.6% |
| A (Control) | Corn | 1 | 0 | 0 | 0 | 0.40 | 20 | 14 | 5.6 | 4.4 | 3.4 |
| B (Invention) | Corn | 3 | 0.1:1 | 0.05 | 2.3 | 0.43 | 11 | 4 | 2.4 | 1.8 | 2 |
| C (Invention) | Corn | 4 | 0.1:1 | 0.05 | 1.9 | 0.43 | 11.5 | 4 | 1.6 | 1.4 | 1.6 |
| D (Invention)[5] | Corn | 3 | 0.2:1 | 0.06 | 3.6 | 0.45 | 19 | 3.8 | 1.8 | 1.4 | 1.6 |
| E (Invention)[6] | Corn | 4 | 0.2:1 | 0.10 | 4.3 | 0.41 | 13 | 4 | 1.4 | 1.4 | 1.4 |

[1] Ratio of STMP to dry starch (by weight).
[2] Phosphate bound to the oxidized starch as an ester.
[3] Unbound phosphate.
[4] Brookfield RVT viscosities at 10 rpm using appropriate spindle for slurries treated with indicated levels of dispersant by weight of clay.
[5] Prepared in Preparation Example 3.
[6] Prepared in Preparation Example 4.

TABLE II

Calcium Carbonate

| Sample | Starch Type | Oxidation Method as By Example | STMP Ratio[1] | % P, as Ester[2] | Product % P, as Salt[3] | Carboxyl D.S. | 75% CaCO$_3$ Viscosities[4] (cps × 10$^{-3}$ Dispersant) | | | | |
|---|---|---|---|---|---|---|---|---|---|---|---|
| | | | | | | | 0.2 | 0.3 | 0.4 | 0.5 | 0.6% |
| F (Invention) | Waxy Maize | 3 | 0.1:1 | 0.06 | 2.3 | 0.43 | 10 | 2 | 1.4 | 2 | 3.5 |
| G (Invention) | Waxy Maize | 3 | 0.1:1 | 0.06 | 0.7 | 0.43 | 0.08 | 0.07 | 0.09 | 0.12 | 0.14 |
| H (Comparison) | Waxy Maize | 1 | 0 | 0 | 0 | 0.42 | 2.6 | 0.90 | 0.85 | 0.88 | 0.88 |
| I (Comparison) | Waxy Maize | 1 | 0 | 0 | 2.4+[5] | 0.42 | 5.1 | 6.1 | 6.8 | 8.3 | 25 |

[1] Ratio of STMP to dry starch (by weight).
[2] Phosphate bound to the oxidized starch as an ester.
[3] Unbound phosphate.
[4] Brookfield RVT viscosities at 20 rpm using appropriate spindle for slurries treated with indicated levels of dispersant by weight of clay.
[5] Composition blended with a mixture of ortho, pyro and tripolyphosphates.

The results in Table I show that all of the samples perform well, but that phosphated, oxidized starch, Samples B–E, perform better than the oxidized starch, Sample A. The phosphated, oxidized starch containing samples had lower viscosity than Sample A at equivalent dispersant concentrations. Thus, phosphated, oxidized starch dispersions are shown to be easier to pump and handle.

Table I also shows that phosphated, oxidized starches are more efficient than their non-phosphated counterparts. This is shown by the fact that less of the phosphated, oxidized starch than the oxidized starch was necessary to achieve a particular viscosity. Specifically, based on the results of Table I, 0.5%–0.6% oxidized starch appears to be necessary to achieve the same viscosity as 0.3% of the phosphated, oxidized starch.

Similar results to those discussed above were achieved with Samples G through I of Table II. However, Sample F did not perform as well as other samples due to the large amount of unbound phosphates.

EXAMPLE 6

The relative effect of dispersant on filler retention was assessed by handsheets in which kaolin clay was dispersed with a phosphated, oxidized corn starch composition (prepared as in Example 3 at an STMP ratio of 0.1:1) having a carboxy D.S. of 0.40. A commercial sodium polyacrylate was used as a control.

Handsheets were made from bleached hardwood kraft beaten to 500 Canadian Standard Freeness (CSF). Clay was added to the pulp at 20 wt. % from 70% stock slurries dispersed at 0.3% (6 lb/ton) with either a phosphated, oxidized starch composition or a commercial sodium polyacrylate dispersant. The pH at the stock chest was 7.3 and a cationically modified polyacrylamide retention aid (powder comprised of 7.0 mole % 2-acryloyloxyethyl trimethylammonium and 93.0 mole % acrylamide, having a 9% moisture content, a Brookfield Viscosity (0.5% solution, #2 spindle) of 250 cps at 25° C. and 60 rpm, and a solution pH (0.5% solution) of 4.7) was added to the chest at level of 0, 0.025, 0.05 and 0.7% by weight of pulp. Forty pound basis handsheets were formed with recycled dilution water. Results are shown in Table III.

TABLE III

| Dispersant | Retention Aid, % | Retention of Clay, % |
|---|---|---|
| Phosphated, oxidized starch | 0 | 14.2 |
| Phosphated, oxidized starch | 0.025 | 59.4 |
| Phosphated, oxidized starch | 0.050 | 79.1 |
| Phosphated, oxidized starch | 0.075 | 89.3 |
| Sodium polyacrylate | 0 | 11.4 |
| Sodium polyacrylate | 0.025 | 48.8 |
| Sodium polyacrylate | 0.050 | 70.6 |
| Sodium polyacrylate | 0.075 | 82.4 |

The data in Table III show that better retention is obtained using phosphated, oxidized starch than using sodium polyacrylate at equal concentrations.

EXAMPLE 7

This example shows preparation and use of gumming and fountain solutions per this invention.

A. Gumming Solution

A 16% concentrated solution of phosphated, oxidized starch was prepared at room temperature. The, 0.1% methyl parasept based on the total weight of the solution, was added to the solution as a preservative. The pH of the solution was lowered to 4.2 using phosphoric acid.

A negative substrate anodized aluminum type plate was then gummed, by pouring a small amount of the above phosphated, oxidized starch gumming solution onto the plate and rubbing it by hand with a cheesecloth. The starch was easy to apply and, after application, no streak marks were observed. The plate was allowed to air dry.

To test the desensitizing properties of the starch solution the above plate was then mounted on a printing press (Davidson 501) and 10,000 copies were printed. The printing quality was good and no problems were observed during printing.

The ability of the phosphated starch gumming solution to protect the plate during storage was evaluated by cleaning the plate used to make 10,000 copies above with a cleaning solution and regumming it with the same phosphated, oxidized starch gumming solution. The gummed plate was stored for six days in the pressroom. Then, twelve hundred copies of paper were printed using this plate and the fountain solution of Sample 5, Table IV below. Again printing quality was good. The phosphated, oxidized starch gumming solution protected the plate during its storage and did not attack the plate metal.

B. Fountain Solution

Six fountain solutions (one gallon each), having the compositions shown in Table IV below, were prepared using the starch used in the gumming solution of Part A of this Example.

TABLE IV

Fountain Solutions

| Fountain Solution Formulation | | | | Amount Starch Solids | |
|---|---|---|---|---|---|
| Solution A (ml) | Solution B (ml) | Water (ml) | Isopropanol (ml) | per gallon of fountain solution (grams) | Solution[1] (pH) |
| 28 | 14 | 3800 | — | 3.6 | 4.5 |
| 28 | 10 | 3800 | — | 2.6 | 4.2 |
| 28 | 5 | 3800 | — | 1.3 | 4.5 |
| 28 | 14 | 3000 | 800 | 3.6 | 4.3 |
| 28 | 10 | 3000 | 800 | 2.6 | 4.6 |
| 28 | 5 | 3000 | 800 | 1.3 | 4.4 |

Solution A = 90.0 gr. zinc nitrate[2]
2.5 gr. phosphoric acid
907.5 gr. dist. $H_2O$
1000.0 gr.

Solution B = 26.0% phosphated, oxidized starch solution
0.1% methyl parasept

[1] Additional phosphoric acid was used to lower pH to between 4.0–4.5.
[2] Zinc nitrate functions as a corrosion inhibitor.

The performance of the fountain solutions was evaluated while printing 2500 sheets with each (using the plate and gumming solution described in part A of this Example). The printing quality was good and the amount of fountain solution needed was normal. Slightly better performance was observed with the 80/20 water/isopropanol mixture used in samples 4, 5 and 6. Further, although solutions having starch solids contents as low as 1.3 grams (samples 3 and 6) performed well, it is recommended to use at least 2.0 grams phosphated, oxidized starch per gallon of solution.

A scum test was run to identify how efficient the fountain solutions are in desensitizing the plate. Printing was continued after the 2500 sheets, described above, were printed without use of the fountain solution. This caused the non-image areas to become ink receptive and, as a result, the entire plate was covered with black ink. Once the entire plate was covered with ink, the fountain solution supply was restarted and the number of sheets it took to desensitize the non-image area of the plate and to give clear printing were counted. With each of the solutions of Table IV, it took 30 sheets or less. The fountain solutions containing isopropyl alcohol performed slightly better than those only containing water.

While the invention has been described with respect to specific embodiments, it should be understood that they are not intended to be limiting and that many variations and modifications are possible without departing from the scope of the invention.

What is claimed is:

1. A phosphated, oxidized starch having a molecular weight of about 1,500 to about 40,000 Daltons, a carboxyl degree of substitution of 0.30 to 0.96, and a phosphate degree of substitution of about 0.002 to about 0.005.

2. The phosphated, oxidized starch of claim 1 wherein the starch has a carboxyl degree of substitution of 0.44 to 0.50.

3. The phosphated, oxidized starch of claim 1 wherein the phosphate degree of substitution is about 0.003 to about 0.005.

4. The phosphated, oxidized starch of claim 2 wherein the phosphate degree of substitution is about 0.004 to about 0.005.

5. The phosphated, oxidized starch of claim 1 which is produced from a starch selected from the group consisting of corn, potato, tapioca, sago, rice and wheat starch.

6. The phosphated, oxidized starch of claim 1 which is produced from a starch selected from the group consisting of waxy maize and potato starch.

7. The phosphated, oxidized starch of claim 1 having a molecular weight of about 5,000 to about 30,000 Daltons.

8. The phosphated, oxidized starch of claim 2 having a molecular weight of 15,000 to 20,000 Daltons.

9. The phosphated, oxidized starch of claim 1 which is an alkali metal salt.

10. The phosphated, oxidized starch of claim 1 which is a sodium salt.

* * * * *

UNITED STATES PATENT AND TRADEMARK OFFICE
CERTIFICATE OF CORRECTION

PATENT NO. : 4,841,040

DATED : June 20, 1989

INVENTOR(S) : JUST & NICKOL

It is certified that error appears in the above-identified patent and that said Letters Patent is hereby corrected as shown below:

Column 1, Line 19, " Dispersions "

should read -- Dispersants--

Column 2, Line 52 " high "

should read -- higher --

Column 5, Line 57, " phosphates "

should read -- phosphated --

UNITED STATES PATENT AND TRADEMARK OFFICE
CERTIFICATE OF CORRECTION

PATENT NO. :     4,841,040
DATED      :     June 20, 1989
INVENTOR(S):     JUST & NICKOL It is certified that error appears in the above-identified patent and that said Letters Patent is hereby corrected as shown below:

Column 6, Line 26, after " oxidation"    -- , -- was omitted

Column 10, Line 61, " The "

should read -- Then --

Signed and Sealed this

Tenth Day of April, 1990

*Attest:*

HARRY F. MANBECK, JR.

*Attesting Officer*     *Commissioner of Patents and Trademarks*